United States Patent [19]

Baer

[11] Patent Number: 4,685,111
[45] Date of Patent: Aug. 4, 1987

[54] PHASE STABILIZATION FOR MODE LOCKED LASERS

[75] Inventor: Michael T. Baer, Mountain View, Calif.

[73] Assignee: Spectra-Physics, Inc., San Jose, Calif.

[21] Appl. No.: 730,001

[22] Filed: May 1, 1985

[51] Int. Cl.⁴ .............................................. H01S 3/098
[52] U.S. Cl. ...................................... 372/18; 372/29; 372/25; 372/82; 372/38
[58] Field of Search ........................ 372/18, 31, 20, 29, 372/32, 24, 25, 13, 82, 69, 38

[56] References Cited

U.S. PATENT DOCUMENTS

| | | | |
|---|---|---|---|
| 3,713,042 | 1/1973 | Kinsel | 372/18 |
| 3,869,680 | 3/1975 | Fletcher | 378/18 |
| 3,995,231 | 11/1976 | Johnson et al. | 372/18 |
| 4,025,875 | 5/1977 | Fletcher et al. | 372/30 |
| 4,375,685 | 3/1983 | LeGroff et al. | 372/32 |
| 4,468,773 | 8/1984 | Seaton | 372/18 |

OTHER PUBLICATIONS

Kinsel et al.; "A Stabilized Mode-Locked Nd:YAIG Laser Source"; IEEE J.Q.E., Jun. 1969, p. 326.

Primary Examiner—Leon Scott, Jr.
Attorney, Agent, or Firm—Donald C. Feix; Paul Davis; T. M. Freiburger

[57] ABSTRACT

A method and system for stabilizing the phase relationship of two RF-controlled mode locked lasers involves monitoring the output of both lasers and, with a phase detector/comparator, generating a voltage proportional to the phase difference between the two lasers. The voltage is amplified and filtered and fed into a voltage controlled phase delay connected to the mode locker of one of the lasers. The phase delay operates to delay the RF signal to the one laser according to the desired phase relationship. By disclosed methods and apparatus a single laser can also be stabilized to its own RF drive source to reduce noise effects, two lasers can be individually stabilized to a single RF source, or two lasers can each be stabilized to their own separate RF sources.

18 Claims, 5 Drawing Figures

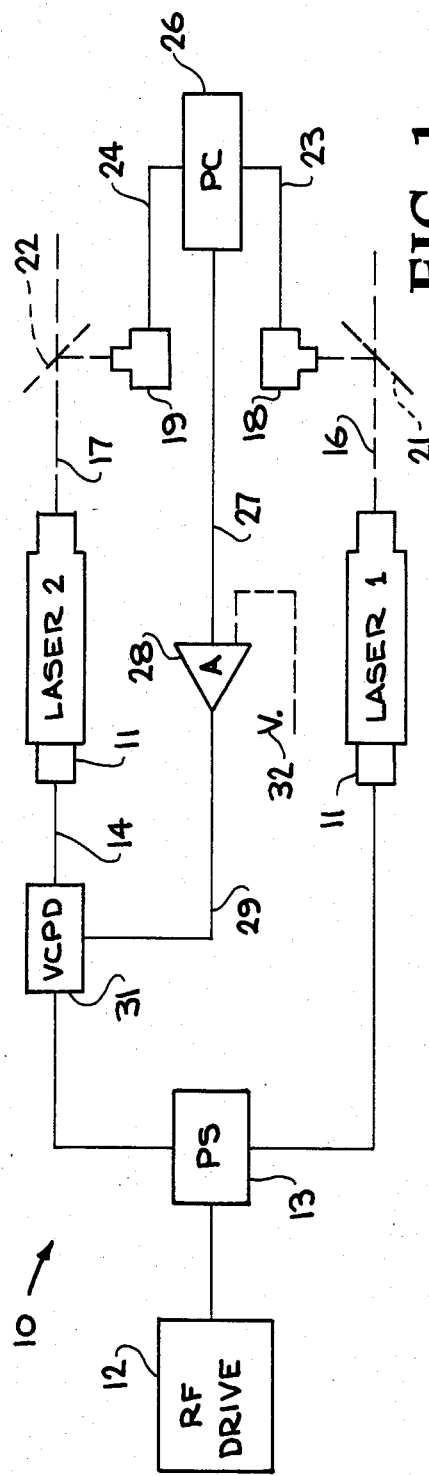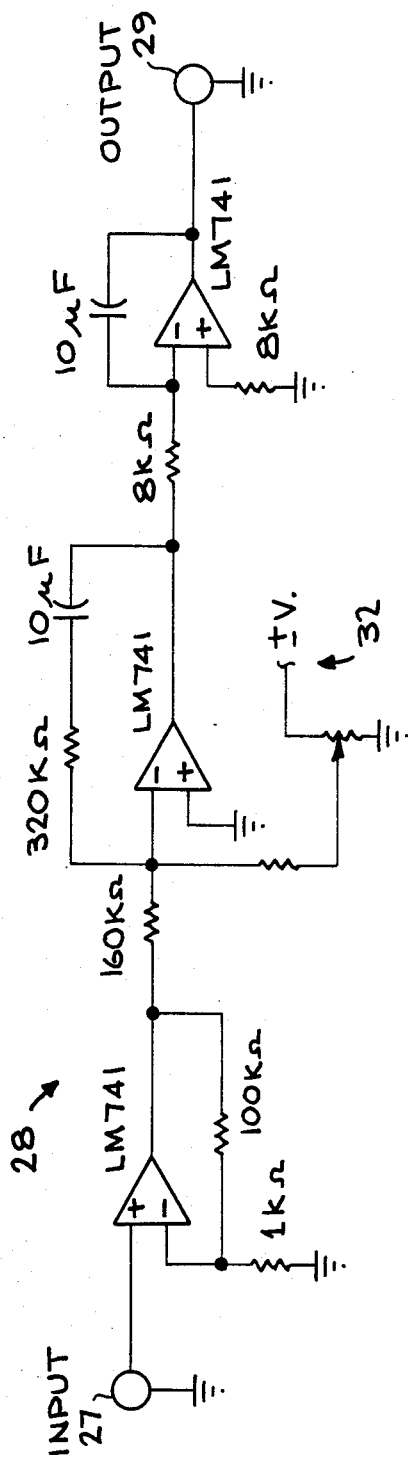

PHASE STABILIZATION FOR MODE LOCKED LASERS

BACKGROUND OF THE INVENTION

The invention relates to lasers, and more particularly to phase stabilization of mode locked lasers, and stable phase scanning of two lasers.

In many applications of mode-locked lasers, a pair of separate lasers are used in conjunction with one another and the output pulse trains must be stable in time with respect to each other or scan with respect to each other, in stable phase relationship. In order to phase stabilize the output pulse trains emitted from two separate mode locked lasers, for short and long term synchronization, a primary technique is to drive both mode lockers off the same radio frequency synthesizer or stable radio frequency (RF) source. This is accomplished, as is well known, using a power splitter to split the RF drive signal to serve both lasers. In addition, the two lasers must have the same cavity length or mirror spacing, with the RF frequency equal to the speed of light divided by four times the cavity length for acousto-optic modelocking, and two times the cavity length for phase modulation mode locking. Thus, with precisely the same cavity length in both lasers, and with both mode lockers of the two lasers driven from the same RF synthesizer, the two lasers should in theory be locked in simultaneous phase, stable with respect to each other.

However, an effect which may be called phase noise associated with both lasers will affect the timing between the pulses, so that it is not perfect. For example, there can be changes in cavity length of the lasers due to mechanical vibration or thermal fluctuations. As either laser has an effective change in cavity length, its phase relationship with respect to the driving source changes. Therefore, the two mode locked trains will drift in phase with respect to one another if either has a differential length change with respect to the other.

Similarly, a single laser's shifting in phase relationship with respect to its driving source can cause problems if subsequent timing signals are derived electronically from the RF source driving the mode locker.

One method of compensating for such cavity length changes is to monitor the optical output of the lasers with a fast photodiode, and then to servo the length of one laser with respect to the other to minimize the phase drift. This is discussed in *Solid State Laser Engineering*, W. Koechner, Springer-Verlag, New York 1976, at page 484. However, this method necessitates the use of a temperature sensitive element, such as a piezoelectric crystal driving a mirror, as an integral part of the cavity of one of the lasers, which considerably increases the sensitivity of the laser to thermal gradients. It also introduces a moving part, which adds to the complexity of the system.

No system of the prior art has been able to accomplish precise stabilization and control of the timing of a mode locked laser's pulse train and of stabilizing the relative timing of modelocked multiple lasers, without expensive and cumbersome mechanical apparatus, and no prior system has been able to accomplish rapid scanning of a pair of lasers while maintaining the lasers in completely stable phase relationship.

SUMMARY OF THE INVENTION

According to the present invention, one method for stabilizing the phase relationship between two mode locked lasers includes driving the mode lockers of both lasers from a single stable RF source, through a power splitter, and monitoring the phase of the pulses from each laser utilizing a fast photodiode at each laser, reading the output of each laser. The output of the fast photodiodes is fed through a phase detector and comparator, which measures the relative phase difference between the two lasers and produces a voltage output signal representing the phase difference. The method includes amplifying and filtering the voltage output signal with an amplifier and loop filter, and feeding the resulting output signal to a voltage controlled phase delay interposed between the power splitter and one of the lasers. Using the voltage controlled phase delay, the RF drive to the one laser is delayed as appropriate to achieve and maintain the desired phase relationship between the lasers.

The voltage controlled phase delay may comprise a voltage controlled resonant circuit whose center frequency is a function of the voltage applied to the diodes, whereby the phase delay is a function of the voltage applied to the diodes.

The phase detector and comparator may include a wide bandwidth double balanced mixer and a low pass filter, the outputs of the two fast photodiodes being heterodyned to direct current by the mixer. Thus, the DC voltage from the low pass filter is proportional to the phase difference between the two lasers over certain ranges.

In another embodiment a method of stabilizing the phase relationship of two lasers comprises stabilizing each of the lasers individually to an RF driving source, using separate servo loops with separate phase delays. This produces an even cleaner output because neither laser is locked to the other laser's "noise", and in certain cases it is advantageous to have stable phase relationship between the RF source driving the mode locker and the output pulse train.

The invention also encompasses maintaining a stable phase relationship between two lasers while scanning the lasers with respect to one another. In this way one can achieve a very quiet (noiseless) pulse probe at various delay times. For example, one of the lasers may be used to excite a dye laser, while the other laser is used to excite an amplifier chain at the dye laser. In this situation the timing of the two lasers with respect to each other is critical because the optical pulse emitted by the dye laser must impinge upon the amplifier chain at precisely the right time in order to be amplified. In other applications, it is often necessary to have a first pulse which excites a sample, and a probing pulse at a fixed or adjustable time delay later. The lasers must remain stable in time with respect to one another in order to obtain time resolved information.

According to the invention, this type of scanning is achieved electronically by adding a controlled variable voltage to the phase error signal in the servo loop.

In this manner, a rapid and phase-stabilized scan can be achieved, with scanning at a few hundred hertz, over a relatively large range. Such fast scanning would be virtually impossible to accomplish using the standard method of moving mirrors to vary the optical path lengths.

It is therefore among the objects of the invention to achieve a much more accurately controlled and stabilized phase relationship between two mode locked lasers, by electronic control with servo feedback monitoring differences in phase and controlling a phase delay of the RF drive input to one or both lasers.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 is a schematic diagram showing a system and method according to the invention for phase stabilization of two mode locked lasers.

FIG. 2 is a schematic diagram showing a loop filter circuit which may be included in the system diagramed in FIG. 1.

DESCRIPTION OF PREFERRED EMBODIMENTS

Figure 3:
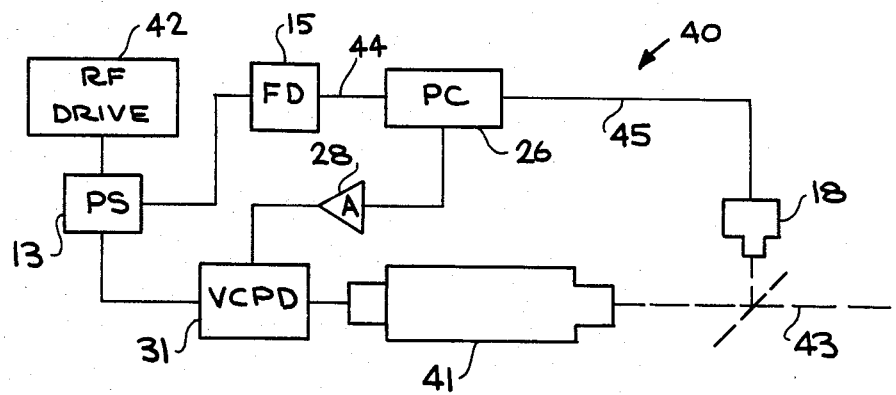
FIG. 3 is a diagram showing a system and method for phase stabilizing a single laser to its own radio frequency drive source, for stable timing of pulse output.

FIG. 1 is a schematic diagram showing a principal method and system 10 according to the present invention for stabilizing the phase of two lasers identified as laser 1 and laser 2 with respect to one another. The system 10 includes the two lasers, each of which is a mode locked laser including an acousto-optic mode locker 11, a radio frequency (RF) drive source or synthesizer 12, and a power splitter 13 for splitting the signal from the RF drive so that both lasers are driven from a common power source. The RF drive frequency is doubled by a frequency doubler 15 to match the frequency of the laser pulse train.

Additional components in the system 10 follow the principles of the invention and form a servo loop for delaying the RF signal 14 to laser 2 in response to the sensing of differences in phase between the two pulse trains 16 and 17 of the lasers 1 and 2, respectively.

These components include fast photodiodes 18 and 19 positioned to monitor the output pulse trains 16 and 17, as shown in FIG. 1, with partially reflective mirrors 21 and 22 directing a small portion of the pulse trains into the photodiodes. The photodetectors 18 and 19 may be PIN photodiodes. A voltage signal 23 and 24 from each fast photodiode 18 and 19 is fed into a phase detector and comparator 26, the function of which is to compare the two signals, which represent timing or phase of the respective pulse trains, and to generate an output signal 27 or phase error signal comprising a voltage whose amplitude represents the difference in phase between the two lasers. The component 26 may be, for example, a phase comparator manufactured and sold by Merrimac Industries, Inc., West Caldwell, New Jersey, as model number PCM-3.

The output 27 of the phase comparator 26 is then fed through an amplifier and loop filter 28, to prevent the servo loop from oscillating.

The amplified and filtered output 29, in the form of a DC voltage proportional to the phase difference between the two laser pulse trains 16 and 17, is fed to a voltage controlled phase delay 31 which is interposed between the RF power splitter 13 and laser 2. The phase delay 31 completes the active servo loop and is effective to delay the RF drive signal to laser 2 by an appropriate amount to lock laser 2 in phase to laser 1. The amount of delay will vary dynamically, depending on varying "noise" in the lasers.

An example of a DC voltage-controlled phase delay 31 suitable for the system 10 is a model PSA-3 manufactured by Merrimac Industries, Inc. as referenced above.

In the system 10 shown in FIG. 1, a relatively simple and inexpensive method and apparatus are provided for locking the phase of one laser with respect to the other by delaying the RF driving signal to the second laser as required in response to the sensing of differences in phase between the two lasers. In a sense, laser 1 is the "master" laser, while laser 2 is the "slave", and laser 2 is locked to the phase of the pulse train 16 of laser 1 even including slight "noise" effects which might be present in laser 1.

As mentioned above, the method and system of the invention can also be used to scan two lasers with respect to one another in a stable way. With laser 1 and laser 2 of FIG. 1 stable in time due to the inclusion of the servo feedback loop just described, the two lasers are scannable in the locked configuration, so that an extremely quiet pulse probe can be achieved at various delay times. It is important in many situations to have the lasers not only matched in time, but adjustable in time and very stable. If a probing pulse is needed at a precise time delay after an initial pulse, the phase relationship between the two lasers must be very stable. Scanning may be required to "tune" such a system.

According to the invention, the scanning of two lasers is performed electronically, without the need for a mechanical delay of one branch of a split beam from a laser, as was done in the prior art. Electronic scanning is accomplished by adding a DC voltage 32, (indicated as a dashed line) to the phase comparison signal, phase comparison which may be accomplished in the amplifier and loop filter 28 as shown in the diagram of FIG. 2. Since the servo feedback loop keeps the phase relationship of the two lasers fixed, the addition of a controlled variable voltage 32 will cause them to scan with respect to one another. Thus, the system of the invention enables a simple and inexpensive method of providing a stable scan between laser 1 and laser 2.

FIG. 2 shows a simple circuit which can be used for the amplifier and loop filter 28 in the system of FIG. 1.

In FIG. 3 is shown a system 40 for stabilizing a laser 41 to itself, i.e. to its own RF drive source 42. In this system the components are the same or similar to those described with respect to FIG. 1, i.e. a fast photodiode 18 reading the laser's pulse train 43, a phase detector and comparator 26, an amplifier and loop filter 28 and a voltage controlled phase delay 31. In this system, however, the phase comparator 26 compares the phase of signals not from two separate laser pulse trains, but from the one pulse train 43 and from the frequency signal of the RF drive 42, split by a power splitter 13, as diagrammed in FIG. 3. Thus, in this case the phase comparator 26 reads the timing of the RF wave peaks entering on the line 44 in FIG. 3, and compares it with the voltage signal entering from the line 45 in FIG. 3, from the photodiode 18, representing laser pulse timing.

In this way, a servo feedback loop is provided that achieves a very clean and quiet pulse train 43. Any "noise" due to internal variations in the laser 41 is detected by the feedback loop and causes the RF drive signal to the laser to be delayed accordingly, to reduce the effect of the noise.

Figure 4:
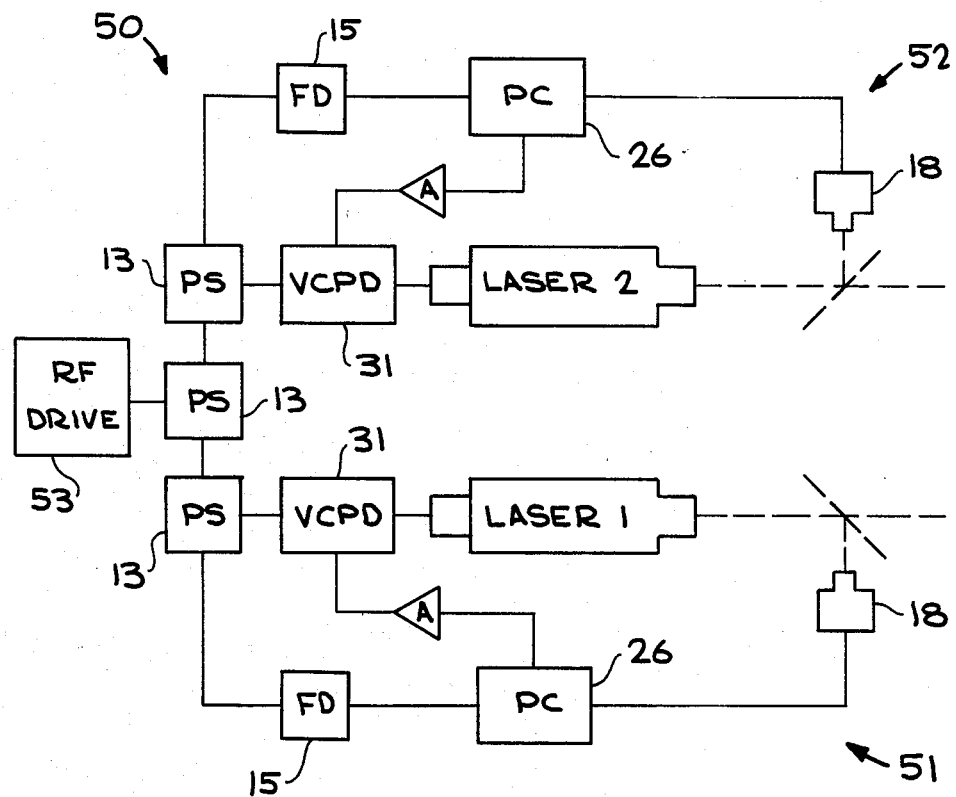
FIG. 4 is a diagram showing a system and method for stabilizing the output and the phase relationship of two lasers, essentially comprising two subsystems each of which is similar to the system of FIG. 3, with a single RF source driving both lasers.

FIG. 4 shows another system 50 according to the invention, essentially comprising a pair of separate subsystems 51 and 52, each of which is similar to the system of FIG. 3. The system of FIG. 4 stabilizes each of two lasers, laser 1 and laser 2, independently to an RF drive source 53. Thus, in this system there is neither "master" nor "slave" laser as was the case with the embodiment of FIG. 1, but rather each laser has its own servo feedback loop with its own voltage controlled phase delay 31. In each laser servo loop, the pulse train is compared with the phase of the RF drive 53, each laser and servo feedback loop being independent in this respect.

The signal from the RF drive source 53 is split with a power splitter 13 (as in FIG. 1) with similar RF signals going to both laser 1 and laser 2, but in each case through an additional power splitter 13 and a phase delay 31. Fast photodiodes 18 send pulse timing information to phase comparators 26, as above, and each phase comparator also receives the RF wave from the drive source 53, via the power splitters. Thus, each phase comparator 26 independently compares two signals (the RF drive signal and the photodiode's output signal), and independently controls a phase delay 31 to stabilize the timing of the pulse train for that particular laser. Since each laser is stabilized to the same RF drive 53, the lasers are kept in stable phase relationship to one another without need to servo one laser to the other, which would result in the sleve laser following the phase noise on the master laser.

As with the system of FIG. 1, a voltage may be applied to the servo feedback loop of one of the lasers in the system of FIG. 4, (not shown in FIG. 4), to scan the two lasers with respect to each other while maintaining a stable phase relationship.

Figure 5:
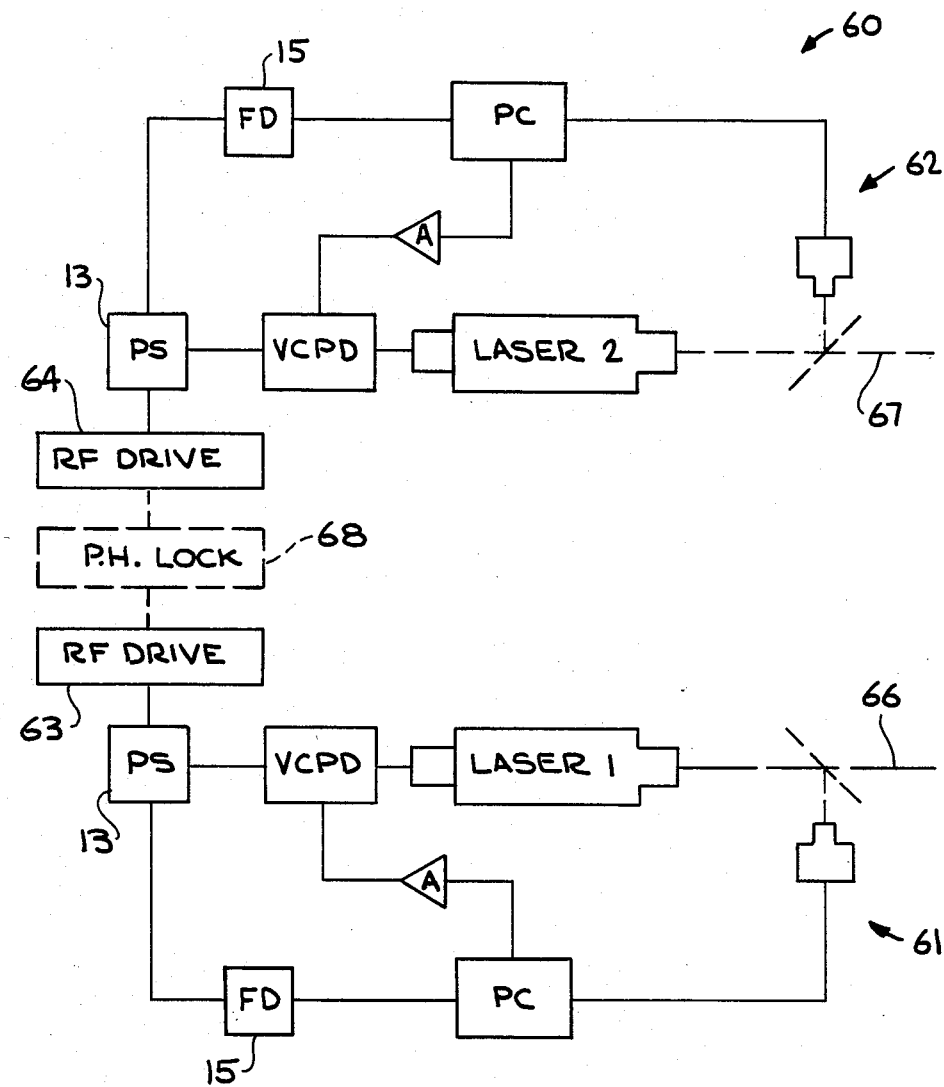
FIG. 5 is a diagram showing a system similar to that of FIG. 4, but using a separate RF source for each laser.

FIG. 5 shows a further variation of the invention, embodied in a system 60 which again comprises a pair of subsystems 61 and 62, each of which is similar to the single-laser servo feedback system of FIG. 3.

In FIG. 5 each subsystem has its own RF drive source 63 and 64. The use of two separate stable RF synthesizers enables the use of different frequencies from the two RF sources, so that a stable scanning of the two lasers with respect to one another can be achieved. As indicated in the diagram of FIG. 5, a pulse train 66 of one frequency from laser 1 may be stably scanned with respect to a pulse train 67 of another frequency from laser 2. As indicated, the two RF synthesizers 63 and 64 may optionally be stabilized to each other by connection to a phase lock 68. Such a phase lock will stabilize the timing of the two RF drives with respect to one another even though the frequencies are different. The phase locking may be accomplished, in a HP325A synthesizer, by connecting the crystal oscillator output to the external clock input with a BNC cable.

It has previously been known to drive a pair of lasers from separate RF drive sources of different frequencies in order to scan the lasers with respect to one another. However, in the prior art the servo feedback loop of the present invention was not included, and consequently such systems employing separate RF sources have tended to show some "noise", causing considerable timing jitter of the two pulse trains with respect to each other.

The apparatus and methods of the invention described herein greatly improve the timing stability of a laser pulse train, and produce an extremely stable phase relationship between the pulse trains of a pair of lasers, either locked in phase or stably scanning with respect to each other. As an example, in a typical laser not including the systems of the invention the timing between pulses might be 12 nanoseconds, with an accuracy of plus or minus 20 picoseconds. With the servo feedback system of the invention, however, the accuracy of the timing can be made as close as plus or minus one picosecond, the width of a single pulse.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method for stabilizing a phase relationship between two mode locked lasers, comprising, driving through a power splitter the mode lockers of both lasers from a single stable radio frequency source, monitoring the phase of pulses from each laser utilizing a fast photodiode output of each laser, feeding the output of the fast photodiodes to a phase detector and comparator, measuring a relative phase difference between the lasers with a phase detector and comparator, thereby producing a voltage output signal or phase error signal representing the phase difference, amplifying and filtering the voltage output signal with an amplifier and loop filter, feeding the resulting output signal to a voltage controlled phase delay interposed between the power splitter and one of the lasers, and delaying the RF drive to said one laser to achieve a desired phase relationship, between the two lasers.

2. The method according to claim 1, wherein the voltage controlled phase delay comprises a voltage controlled resonant circuit whose center frequency is a function of the voltage applied to the fast photodiodes, such that the phase delay is a function of the voltage applied to the fast photodiodes.

3. The method according to claim 1, further including stably scanning the two lasers with respect to one another by applying an additional known voltage to the phase error signal.

4. A method for scanning two mode locked lasers with respect to one another while maintaining the lasers in stable phase relationship, comprising, driving through a power splitter the mode lockers of both lasers from a single stable radio frequency source, monitoring phase of the pulses from each laser and utilizing fast photodiodes output of each laser, feeding the output of the fast photodiodes to a phase detector and comparator, determining the relative phase difference between the two lasers with the phase detector and comparator, thereby producing a voltage output signal or phase error signal representing the phase difference, amplifying and filtering the phase error signal, feeding the resulting phase error signal to a voltage controlled phase delay interposed between the power splitter and one of the lasers, to maintain a stable phase relationship between the lasers, and adding a known voltage to the phase error signal to scan the two lasers with respect to one another.

5. A method for stabilizing a phase relationship of two RF driven lasers, comprising, monitoring the output of both lasers, and generating a signal for each laser representing its pulse timing, comparing the signals from the two lasers, generating a phase comparison signal representing the difference in phase between the two lasers, feeding the phase comparison signal to a phase delay device to delay an RF drive signal to one of the lasers, the phase difference between the lasers being represented by the phase comparison signal, such that said one laser is locked in phase relationship to the other.

6. The method of claim 5, further including adding a known voltage to the phase comparison signal to introduce a controlled, stable scanning of one laser with respect to the other.

7. The method of claim 5, wherein the phase comparison signal comprises a DC voltage proportional to the phase, difference, and the phase delay device comprises a voltage controlled phase delay.

8. The method of claim 7, further including adding a known and controlled DC voltage to the phase comparison signal to introduce a controlled, stable scanning of one laser with respect to the other.

9. A method for stabilizing pulse timing of an RF-driven mode-locked laser, comprising, monitoring the output of the laser with a fast photodiode, and generating a pulse timing signal representing pulse timing, feeding the signal to a phase comparator which also receives the output signal of an RF drive source or synthesizer driving the laser, and comparing the pulse timing signal with a frequency doubled RF drive source output signal, generating a phase DC voltage comparison signal representing the phase difference between the pulse timing signal and the RF output signal, filtering and amplifying the phase comparison signal, and feeding the phase comparison signal to a voltage controlled phase delay interposed between the RF drive source and the laser to delay the RF drive signal to the laser, the phase difference of the laser being represented by the phase comparison signal, such that noise in the laser varying the effective length of the laser is compensated for, said compensation producing a pulse train highly stable in timing.

10. The method of claim 9, including a second laser driven by the same RF drive source, and the method further including stabilizing the phase relationship of the two lasers by supplying phase stabilization means for monitoring the second laser's output, comparing the second laser's pulse timing with that of the RF drive source and delaying the RF drive signal to the second laser as a result of phase differences between the second laser and the RF drive source, such that each laser is stabilized independently to a single RF drive source, thereby producing a highly stable pulse train at each laser and a stable phase relationship between the two lasers.

11. The method of claim 9, including a second laser driven by a second, separate RF drive source and including a servo feedback loop with for monitoring the second laser's output, comparing its pulse timing with that of the second RF drive source and delaying the RF drive signal to the second laser accordance with phase differences between the second laser and the second RF drive source, the two RF drive sources having different frequencies, such that each laser is stabilized independently to its RF drive source, thereby producing a highly stable pulse train at each laser, and the two laser pulse trains are scanned stably with respect to one another.

12. The method of claim 11, further including stabilizing the two RF synthesizers with respect to each other by using a common time base in the two RF synthesizers, thus phase locking the two sources.

13. A system for stabilizing a phase relationship of two RF driven lasers, comprising, photodetector means for monitoring the output of both lasers and for generating a signal for each laser representing its pulse timing, a phase detector means and comparator means receiving the output of the photodetector means, for comparing the signals for the two lasers, means for generating a phase comparison signal representing the difference in phase between the two lasers, and phase delay means receiving the phase comparison signal, for delaying the RF drive signal to one of the lasers, the phase difference between the lasers being represented by the phase comparison signal, such that one laser is locked in phase relationship to the other.

14. The system of claim 13, further including means for adding a known voltage to the phase comparison signal to introduce a controlled, stable scanning of one laser with respect to the other.

15. The system of claim 13, wherein the phase comparison signal comprises a DC voltage proportional to the phase difference, and the phase delay means comprises a voltage controlled phase delay.

16. A system for stabilizing the pulse timing of a laser driven by an RF drive source, comprising, photodetector means for monitoring the output of the laser and for generating a pulse timing signal representing pulse timing, phase comparator means for receiving the pulse timing signal and the output signal of the RF drive source driving the laser, and for comparing the pulse timing signal with the RF drive source output signal, and for generating a phase DC voltage comparison signal representing the phase difference between the pulse timing signal and the RF output signal, means for filtering and amplifying the phase comparison signal, and a voltage controlled phase delay interposed between the RF drive source and the laser with means for delaying the RF drive signal to the laser, the phase difference of the lasers being represented by the phase comparison signal, such that noise in the laser varying the effective length of the laser is compensated for, said compensation producing a pulse train highly stable in timing.

17. The system of claim 16, including a second laser driven by the same RF drive source and including phase stabilization means for monitoring the second laser's output, for comparing the second laser's pulse timing with that of the RF drive source and for delaying the RF drive signal to the second laser phase differences between the second laser and the RF source, such that each laser is stabilized independently to a single RF drive source, thereby producing a highly stable pulse train at each laser and a stable phase relationship between the two lasers.

18. The system of claim 16, including a second laser driven by a second, separate RF drive source and including a servo feedback loop with a phase stabilization means for monitoring the second laser's output, for comparing its pulse timing with that of the second RF drive source and for delaying the RF drive signal to the second laser phase differences betweeen the second laser and the second RF drive source, the two RF drive sources having different frequencies, such that each laser is stabilized independently to its RF drive source, thereby producing a highly stable pulse train at each laser, and the two laser pulse trains are scanned stably with respect to one another.

* * * * *